(12) United States Patent
Young et al.

(10) Patent No.: US 8,489,536 B1
(45) Date of Patent: *Jul. 16, 2013

(54) PRESCRIPTIONS FOR NONSUPPORTED FEATURES OF AN ELECTRONIC DOCUMENT

(75) Inventors: Jeff Young, County Louth (IE); Ed A. Taft, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,473

(22) Filed: Mar. 26, 2012

Related U.S. Application Data

(63) Continuation of application No. 12/026,070, filed on Feb. 5, 2008, now Pat. No. 8,175,996.

(51) Int. Cl.
*G06F 15/18* (2006.01)
*G06F 17/20* (2006.01)

(52) U.S. Cl.
USPC .............................. 706/47; 709/228; 705/331

(58) Field of Classification Search
USPC .......................................................... 706/47
See application file for complete search history.

(56) References Cited

U.S. PATENT DOCUMENTS

| | | | |
|---|---|---|---|
| 8,175,996 B1 | 5/2012 | Young et al. | |
| 2008/0082903 A1* | 4/2008 | McCurdy et al. | 715/200 |
| 2008/0183762 A1* | 7/2008 | Komamura | 707/200 |
| 2008/0291486 A1* | 11/2008 | Isles et al. | 358/1.15 |

OTHER PUBLICATIONS

"U.S. Appl. No. 12/026,070, Advisory Action mailed Aug. 26, 2011", 3 pgs.
"U.S. Appl. No. 12/026,070, Amendment Under 37 C.F.R. filed Mar. 28, 2012 in response to Notice of Allowance mailed Dec. 28, 2011", 7 pgs.
"U.S. Appl. No. 12/026,070, Appeal Brief filed Oct. 20, 2011", 23 pgs.
"U.S. Appl. No. 12/026,070, Final Office Action mailed Jun. 15, 2011", 26 pgs.
"U.S. Appl. No. 12/026,070, Non Final Office Action mailed Dec. 23, 2010", 18 pgs.
"U.S. Appl. No. 12/026,070, Notice of Allowance mailed Dec. 28, 2011", 14 pgs.
"U.S. Appl. No. 12/026,070, Preliminary Amendment filed Jul. 28, 2008", 3 pgs.
"U.S. Appl. No. 12/026,070, Response filed Mar. 23, 2011 to Non Final Office Action mailed Dec. 23, 2010", 18 pgs. "U.S. Appl. No. 12/026,070, Response filed Aug. 2, 2011 to Final Office Action mailed Jun. 15, 2011", 19 pgs.
"U.S. Appl. No. 12/026,070, Response to Rule 312 Communication mailed Apr. 9, 2012", 1 pgs.
"U.S. Appl. No. 12/026,070, Response to Rule 312 Communication mailed Apr. 19, 2012", 2 pgs.

* cited by examiner

*Primary Examiner* — Kakali Chaki
*Assistant Examiner* — Kalpana Bharadwaj
(74) *Attorney, Agent, or Firm* — Schwegman, Lundberg & Woessner, P.A.

(57) ABSTRACT

In some embodiments, a method includes receiving an electronic document that comprising a list of one or more features specified for use during processing of the electronic document by an application. The method also includes determining if one or more specified features from the list of specified features is not supported by the application. The method includes executing an operation that is defined by a prescription associated with one or more specified features, in response to a determination that the one or more specified features is not supported by the application, wherein the prescription defines at least one of an operation to be performed or a restriction to be applied by the application as part of subsequent processing of the electronic document.

24 Claims, 5 Drawing Sheets

PRESCRIPTIONS FOR NONSUPPORTED FEATURES OF AN ELECTRONIC DOCUMENT

CROSS-REFERENCE TO RELATED APPLICATION(S)

This application is a continuation of and claims the benefit of priority under 35 U.S.C. 120 to U.S. application Ser. No. 12/026,070 filed Feb. 5, 2008, which is incorporated herein by reference in its entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright© 2008, Adobe Systems incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Different applications that are used to generate and modify electronic documents may support different features. To illustrate, a later version of an application may support features than a prior version of the application does not support. For example, the later version of an application may support a particular type of multimedia (video) that is not supported by the prior version.

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
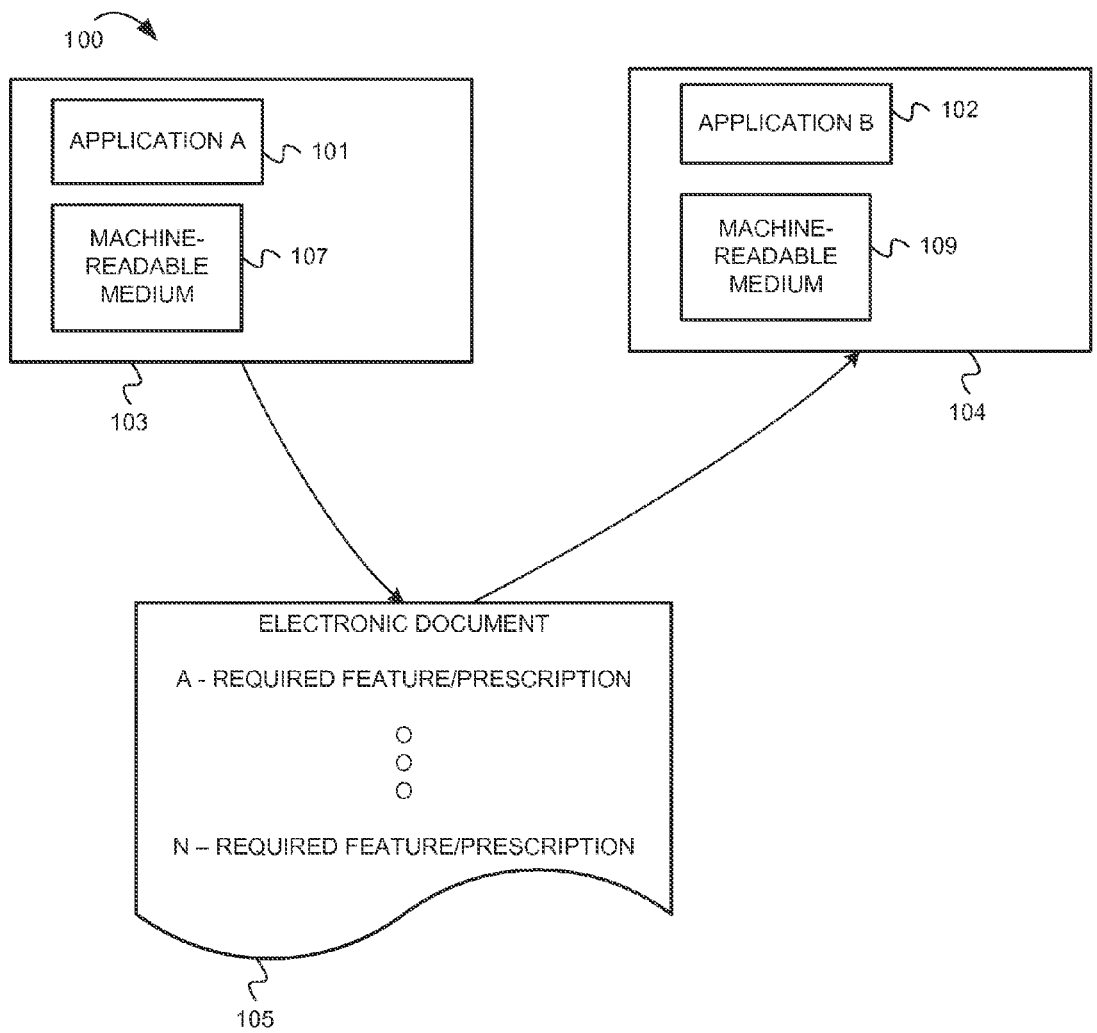
FIG. 1 is a system diagram for creating and subsequently processing of electronic documents that include features and associated prescriptions, according to some example embodiments.

Methods, apparatus and systems for prescriptions for unsupported features for an electronic document are described. In the following description, numerous specific details are set forth. However, it is understood that embodiments of the invention may be practiced without these specific details. In other instances, structures and techniques have not been shown in detail in order not to obscure the understanding of this description.

As used herein, the term "electronic document" may comprise any type of electronic content for use in electronic form. Examples of an electronic document may include a page descriptive language document (e.g., a Portable Document Format ("PDF") document which may be viewed and modified in one of the ADOBE® ACROBAT® programs or an eXtensible Markup Language (XML) Paper Specification (XPS) document), a web page, a word processing document (such as a Microsoft® Word document), a spread sheet document, other page-descriptive electronic content, a hypertext document, a markup language document, a declarative specification document (such as for example a hypertext markup language HTML or XML document), a fillable form or data describing application graphical user interface, etc.

As used herein, the term "feature" may comprise any type of property or capability of an application. An example of a feature may include support to process different forms of multimedia (such as video, audio, etc.). Another example of a feature would be the encryption of a completed form (a type of electronic document) prior to submission of such form. A feature may also include support for interaction with a form. In particular, the feature may be the ability of a subsequent user of an electronic form to enter data into fields of the form. Another example of a feature may include support for certain currency or mathematical operations for a spreadsheet application. For example, a spreadsheet may be created based on the Euro, Dollar, Pound, Yen, Rupees, etc. Accordingly, a specified feature of a subsequent application is support to process numbers defined in terms of this particular currency. Other examples of a feature are described in more detail below.

As used herein, the term "prescription" may comprise any type of corrective action or operation that is to be taken (e.g., by an application) in response to a request for a specified feature that is not supported by the application. A prescription may also comprise a restriction to be applied by the application if a specified feature is not supported by the application. An example of a prescription includes not allowing the electronic document to be opened. Another example includes disabling interactivity. For example, if the electronic document is some type of form, a user may not be allowed to input data therein. Another example of a prescription includes not allowing a user to submit an electronic document. For example, assume that the electronic document is a form wherein a user fills in certain fields and submits the form thereafter to an application to process the completed form. The prescription may not allow the user to submit the form. Other examples of a prescription include not allowing printing, saving, editing or digitally signing of the electronic document.

Example embodiments may be used in conjunction with the processing of electronic documents by applications. In particular, example embodiments relate to processing of an electronic document that use one or more features that are not supported by the application that is to open and process such document. For example, a current version of an application may initially create an electronic document that an earlier version of the application may subsequently attempt to open, edit, etc. The earlier version of the application may not support all of the features that are used by this electronic document.

In some example embodiments, the application that created the electronic document may define features that are specified to be supported by a different application that is to subsequently process such document. In some example embodiments, the application that created the electronic document may also define one or more prescriptions for a specified feature. Such prescriptions define what the different application is specified to do if the feature is not supported by this different application. Accordingly, some example embodiments provide an initial indication (to the different application that is to process the electronic document) of what specified features that the electronic document uses. Also, some example embodiments also enable the application (and/or the creator using the application) that created the document to specify prescriptions if the specified features are not supported. Example prescriptions may include not allowing the document to be opened, printed, edited, etc. Another example prescription may include outputting a message to the display that describe that a feature is not support, possible problems because a feature is not supported, possible solutions, etc. In some example embodiments, a non-supported specified feature may have more than one prescription. For example, the different application (that does not support the specified feature) may display a notification message and also not allow the document to be printed.

An example of a prescription for a nonsupported feature may relate to encryption of data that is submitted by a user of a form. In particular, a first application (such as software for creating forms) may create a form (such as a PDF document) that includes parts that are to be subsequently completed by an end user. A second application may be used by the end user to complete parts of the form. Such data entered by the end user may be confidential (such as the social security number, date of birth, etc. of the end user). For example, the form may be some type of legal document. The first application may have created the form such that the data entered by the end user is to be encrypted prior to submission of the form. Accordingly, a specified feature may be encryption of such data. If encryption is not supported, a prescription may include preventing the submission of a completed form so that the end user's confidential information is not exposed unencrypted.

Different electronic documents that are created from a given application may use different features and associated prescriptions. For example, an electronic document may include a video clip. In a first scenario, the video clip may be incidental to the understanding of the document. In such an example, if the second application cannot support the playing of the video clip, the prescription may be the displaying of a message that warns the user that the document includes video that cannot be displayed. In a second scenario, the video clip may be essential to the understanding of the document. In such an example, if the second application cannot support the playing of the video clip, the prescription may be to preclude the opening of the document.

in another example, a first application may create electronic documents that are engineering drawings that include various lines of different widths. If the engineering drawings are scaled beyond a certain point, some of the lines may disappear. If such a scaled drawing is printed, such lines may be missing from the printout. These lines may be essential to understanding the drawing. In this example, a specified feature may be the enforcement that the drawing be printed at a certain scale level (e.g., 100%). Thus, one prescription if the specified feature is not supported is that the drawing cannot be printed. Accordingly, in contrast to conventional approaches that may ignore the unsupported features, some example embodiments define specified features and associated prescriptions if such features are not supported.

FIG. 1 is a system diagram showing creating and subsequently processing of electronic documents that include features and associated prescriptions, according to some example embodiments. A system 100 comprises a device 103 that includes an application A 101 and a machine-readable medium 107. The system 100 also comprises a device 104 that includes an application B 102 and a machine-readable medium 109.

The application A 101 is used to create an electronic document 105 that is subsequently processed by the application B 102. The application A 101 and the application B 102 may be software, hardware, firmware or a combination thereof for executing operations, according to some example embodiments. In some example embodiments, the application A 101 and the application B 102 may be various types of software that can create and subsequently process different types of electronic documents. In some example embodiments, the application A 101 may create the electronic document 105 using one or more features or version of such features that are not supported by the application B 102. For example, the application A 101 and the application B 102 may be different versions of a same application. In some example embodiments, the application A 101 may be a later version of the application B 102.

The system 100 illustrates that the application A 101 and the application B 102 are in two different devices. However, embodiments are not so limited. In some example embodiments, the application A 101 and the application B 102 may be executed in a same device. In some example embodiments, the device 103 and the device 104 are coupled together through a network. As an example, the application A 101 may be an application to create forms. A user may create a form using the application A 101. This form may be forward to other users to complete fields therein and to submit such form for processing. Such other users may use the application B 102 to complete and submit such form.

As further described below, the application A 101 creates the electronic document 105 that includes one or more features that are specified for subsequently processing of the electronic document 105. The application A 101 also includes one or more prescriptions for each of the one or more specified features. In some example embodiments, these prescriptions define certain actions to be performed by a subsequent application (the application B 102) prior to processing of the electronic document, if the subsequent application does not support a feature. An example of a specified feature would be the encryption of a completed form prior to submission of such form. The associated prescription may be the preclusion of the submission of the completed form (if encryption is not supported).

The machine-readable medium 107 and the machine-readable medium 109 may store the electronic document 105 at different points of creation and processing of the electronic document 107. The machine-readable medium 107 and the machine-readable medium 109 includes any mechanism which provides (e.g., stores and/or transmits) information in a form accessible by a machine (e.g., a computer, a network device, a personal digital assistant, manufacturing tool, any device with a set of one or more processors, etc.). In example embodiments, the machine-readable medium 107 and the machine-readable medium 109 includes volatile and/or non-volatile media (e.g., read only memory (ROM), random access memory (RAM), magnetic disk storage media, optical storage media, flash memory devices, etc.).

Figure 2:
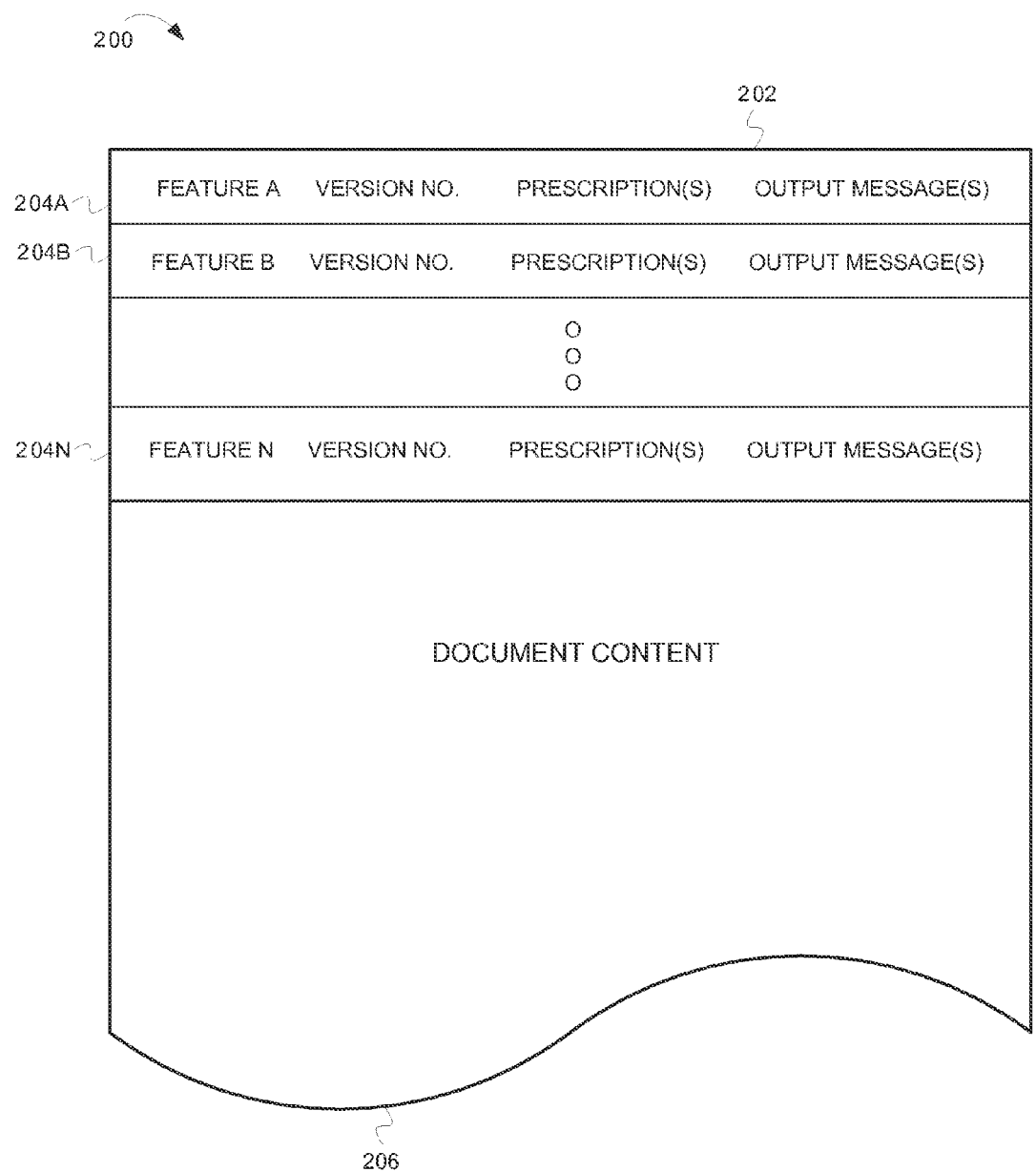
FIG. 2 illustrates an electronic document having specified features and associated prescriptions, according to some example embodiments.

FIG. 2 illustrates an electronic document having specified features and associated prescriptions, according to some example embodiments. An electronic document 200 includes document content 206, which is the data created, modified, etc. by the user. For example, the document content 206 may comprise parts of a form for a PDF document, entries in a spreadsheet document, words for a word processing document, etc. In one aspect, the electronic document 206 further includes a catalog 202. The catalog 202 includes one to any number of entries 204A-204N. In some example embodiments, the catalog 202 is representative of any type of data structure to store data regarding specified features and the associated prescription(s). While described such that the catalog 202 is stored at the beginning of the electronic documents, such data may be stored in other locations of the electronic document (e.g., at the end). In some example embodiments, the data may be stored separate from the electronic document. Such data may be stored in a separate file on a same or different machine-readable media relative to the electronic document. For example, in some example embodiments, such data may be stored in a central server that is accessible by the application to subsequently process the electronic document. While described such that the entries are within a catalog, example embodiments may store the entries into any type of data structure. One of the entries 204 includes a feature (e.g., feature A) which the creator of the electronic document 206 defines. An example of a feature may include support to process different forms of multimedia (such as video, audio, etc.). In particular, if an electronic document includes video and if video is not supported, a person viewing the electronic document may not be able to understand the contents therein. For example, if the electronic document is a marketing presentation, subsequent viewers may include potential buyers of a product. The video may be required to understand how the product operates, benefits, etc. Another example of a feature may include interaction with a form. In particular, the feature may be the ability of a subsequent user of an electronic form to enter data into fields of the form.

Another example of a specified feature may include support for certain currency for a spreadsheet application. For example, a spreadsheet may be created based on the Euro, Dollar, Pound, Yen, Rupees, etc. Accordingly, a specified feature of a subsequent application is support to process numbers defined in terms of this particular currency. An example of another feature may include a mathematical operation for a spreadsheet application. In particular, if a certain mathematical operation is not supported, the data in the spreadsheet may be inaccurate.

Another example of a specified feature may include support for transparency in content streams. Another example of a specified feature may include support for optional content for an electronic document. In some example embodiments, an example of a specified feature may include support for rendering content conforming to a given specification (e.g., a given XFA (eXtensible Markup Language (XML) Form Architecture) specification). Another example of a specified feature may include support for user interaction with forms defined according to a given specification. Another example of a specified feature may include support for certain types of navigation in an electronic document (e.g., link annotations, goto actions, bookmarks, etc.). In some example embodiments, another example of a specified feature may include support for different types of annotations (such as text notes, markup annotations, multimedia (screen) annotations, sound annotations, movie annotations, three-dimensional (3D) annotations, etc.). Another example of a specified feature may include support for 3D data streams according to a particular specification (U3D (Universal 3D) specification, etc.). Another example of a specified feature may include support for execution of certain programs, scripts, etc. For example, the specified feature may include support for execution of JAVA scripts. Another example of a specified feature may include support for file attachment to the electronic document. In some example embodiments, another example of a specified feature may include support for packaging (e.g., additional file metadata, user interface control, etc.). Another example of a specified feature may include support for digital signatures and modification detection of such signatures for an electronic document. Another example of a specified feature may include support for two-dimensional barcodes.

An entry 204 in the catalog 202 may include a version number for a specified feature. Certain specified features evolve over successive versions. In some example embodiments, an electronic document may contain uses of a feature that can be successfully interpreted by an application supporting a specific version of a feature, a specific version or higher, etc. In some example embodiments, one of the entries 204 may or may not include a specific version of a specified feature.

An entry 204 in the catalog 202 may include one or more prescriptions that are associated with a specified feature. In some example embodiments, a prescription defines a behavior that is triggered or a restriction that is imposed if this application does not support the associated specified feature. An example of a prescription includes that the electronic cannot be opened. Another example of a prescription may include disabling certain or all interactivity with the electronic document. For example, a user cannot enter data into certain or fields of a form. Another example of a prescription may include disabling submission of a form. Another example of a prescription may include disabling printing of the electronic document. Another example of a prescription may include disabling the digital signing of the electronic document. Another example of a prescription may include disabling the editing of the electronic document. Accordingly, the electronic document is a read-only document. Another example of a prescription may include disabling the saving of the electronic document.

An entry 204 in the catalog 202 may include one or more output messages that are displayed. For example, the output message may be display prior to opening the document, after certain parts of the document are displayed, edited, printed, etc. The output messages may be warnings that the feature is not supported, possible problems because the feature is not supported, possible solutions to correct the unsupported feature. For example, the output message may provide instructions on how to upgrade the application to a different version that does provide this supported feature.

Figure 3:
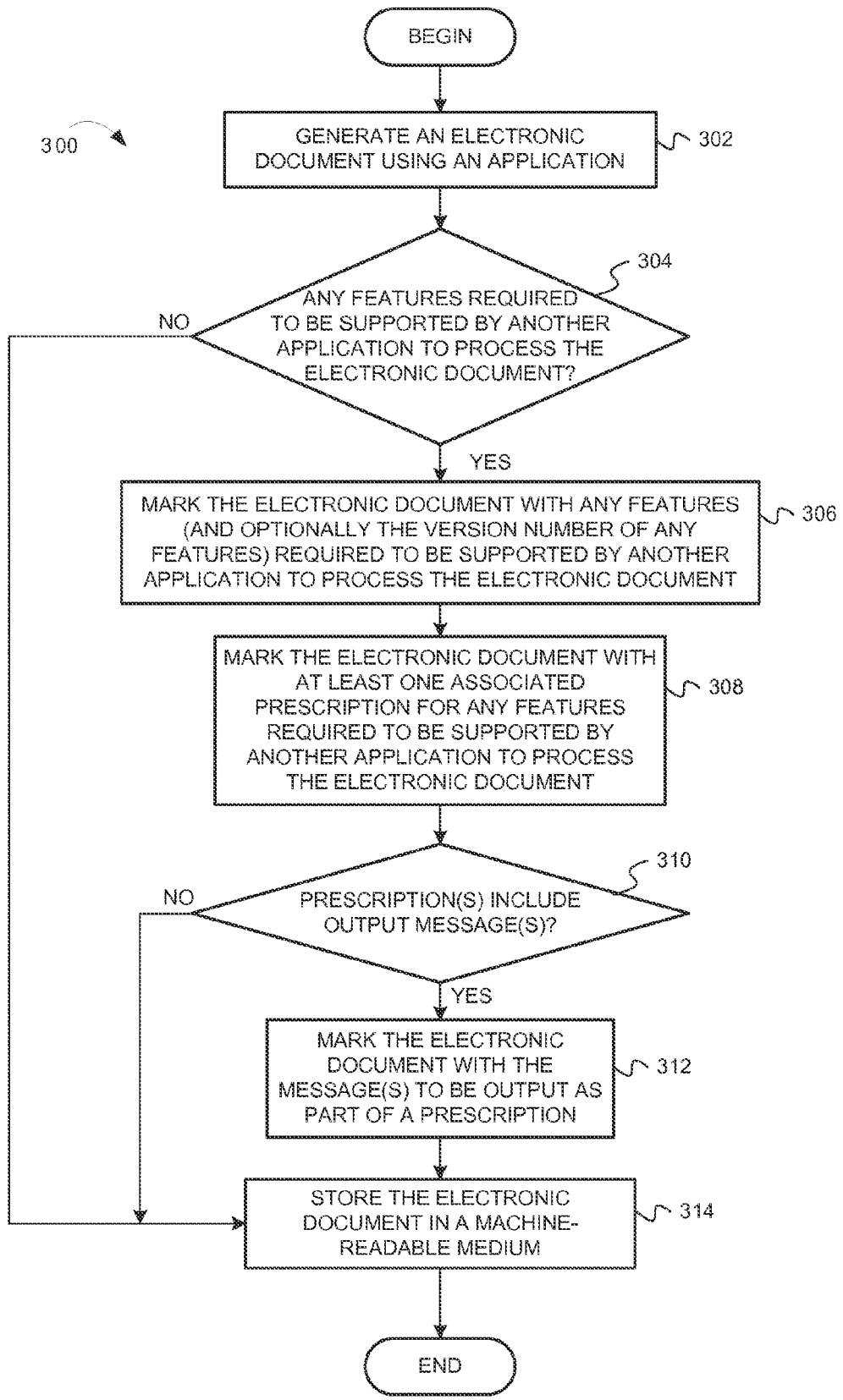
FIG. 3 is a diagram of a method for processing an existing electronic document that includes features and associated prescriptions, according to some example embodiments.

Operations, according to example embodiments, are now described. In certain embodiments, the operations are performed by instructions residing on machine-readable media (e.g., software), while in other embodiments, time methods are performed by hardware or other logic (e.g., digital logic). FIG. 3 is a diagram of a method for creating an electronic document that include features and associated prescriptions, according to some example embodiments. A method 300 is described with reference to FIGS. 1-2. In some example embodiments, the method 300 is performed by the application A 101. The method 300 commences at block 302.

At block 302, the application A 101 generates an electronic document. For example, a user of an application that creates a PDF document, word processing document, spreadsheet document, etc. may create an electronic document using the application A 101. As described above, the application A 101 may have a number of different features that are used to create the electronic document. The method 300 continues at block 304.

At block 304, the application A 101 determines whether any features used to generate the electronic document are specified to be supported by a different application that subsequently processes the document. In some example embodiments, this determination is made by the user (creator) that generates the electronic document. Alternatively or in addition, the application A 101 may make this determination. For example, assume the electronic document is a form that includes fields that are to be completed by a subsequent user of the electronic document. For all such documents, the application A 101 may require that any application to subsequently process the documents have the feature to encrypt the completed form prior to submission. If there are not specified features, the method 300 continues at block 314 (which is described in more detail below). Otherwise, the method 300 continues at block 306.

At block 306, the application A 101 marks the electronic document with any features specified to be supported by another application to process the electronic document. As described above (FIG. 2), the application A 101 may mark the electronic document by storing the names of the specified features in the catalog that is part of the electronic document. In some example embodiments, the application A 101 also marks the electronic document with a version number, range of version numbers, etc. for a given feature. For example, the application A 101 may mark the electronic document with a feature at version 1.0 or higher. In some example embodiments, if a version is not included, it is assumed that any version of a feature is acceptable. As described above, the electronic document may be marked with one to any number of specified features (and optional version number). In some example embodiments, a creator of the electronic document may use the application A 101 to add these specified features (and optional version number). For example, a person that develops electronic forms using the application A 101 may mark the forms with these specified features. Alternatively or in addition, the application A 101 may add these specified features to an electronic document. In particular, the application A 101 may require that certain types of electronic documents include certain specified features. The method 300 continues at block 308.

At block 308, the application A 101 marks the electronic document with at least one associated prescription for any features specified to be supported by another application to process the electronic document. As described above (FIG. 2), the application A 101 may mark the electronic document by storing the names of the prescriptions in the catalog that is part of the electronic document. In some example embodiments, if the electronic document is marked to require a feature, the electronic document is specified to be marked with an associated prescription. As described above, one feature may include any number of prescriptions. For example, if a feature is not supported, the prescriptions may include preclusion to edit and print the electronic document. Similar to the features, in some example embodiments, the application A 101 or the creator of the electronic document marks the electronic document with the prescriptions. The method 300 continues at block 310.

At block 310, the application A 101 determines whether the prescriptions include any output message(s). As described above, the prescription for a specified feature may include a message that is output to a display screen of the device that is executing the different application that is processing the electronic document. The messages may be a warning that a feature is not supported, a warning that the document cannot be opened, a possible solution to the feature not being supported (such as upgrading to a newer version of the different application), etc. if there are no output messages, the method 300 continues at block 314 (which is described in more detail below). Otherwise, the method 300 continues at block 312.

At block 312, the application A 101 marks the electronic document with the output message(s) to be output during processing of the electronic document by another application. As described above (FIG. 2), the application A 101 may mark the electronic document by storing the output message(s) in the catalog that is part of the electronic document. The method continues at block 314

At block 314, the application A 101 stores the electronic document in a machine-readable medium. For example, the electronic document may be stored in a local secondary storage device, local memory (e.g., random access memory), a secondary storage device on a different device, a memory on a different device or any combination thereof. The method 300 is complete.

Figure 4:
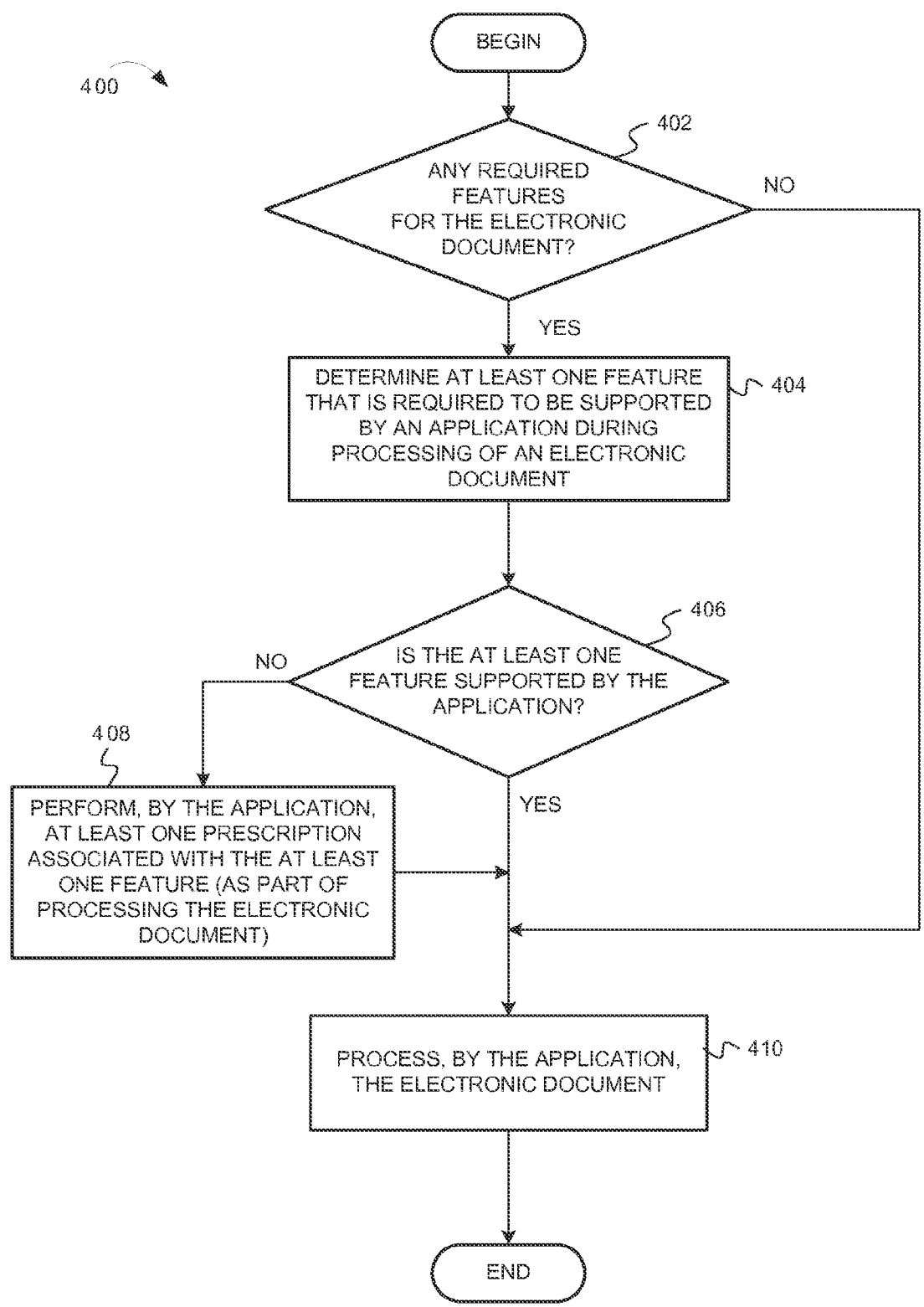
FIG. 4 is a diagram of a method for processing an existing electronic document that includes features and associated prescriptions, according to some example embodiments.

Operations for processing an existing electronic document are now described. These operations are performed by an application that is different from the application used to create the electronic document. In particular, FIG. 4 is a diagram of a method 400 for processing an existing electronic document that includes features and associated prescriptions, according to some example embodiments. A method 400 is described with reference to FIGS. 1-2. In some example embodiments, the method 400 is performed by the application B 102. In some example embodiments, the method 400 is performed prior to processing of an existing electronic document. For example, the method 400 may be performed prior to opening, editing, printing, etc. of an electronic document. The method 400 commences at block 402.

At block 402, the application B 102 determines whether there are any specified features for the electronic document. The application B 102 may traverse the catalog that is part of the electronic document to make this determination (see description of FIG. 2 above). In particular, the application B 102 may determine if the catalog includes any entries that include a specified feature. If there are no specified features for the electronic document, the method 400 continues at block 410 (which is described in more detail below). Otherwise, the method 400 continues at block 404.

At block 404, the application B 102 determines at least one feature that is specified to be supported during processing of the electronic document. As described above, a creator of the electronic document using a different application or the different application itself may require any number of features for an electronic document. The method 400 continues at block 406.

At block 406, the application B 102 determines whether the specified features are supported for the processing of the electronic document. If the specified features are not recognized, the application B 102 is assumed not to support such features. The listing of the specified features in the catalog may be in any syntax such that both the application A 101 and the application B 102 are able to process such features. If the specified features are supported, the method 400 continues at block 410 (which is described in more detail below). Otherwise, the method 400 continues at block 408.

At block 408, the application B 102 performs at least one prescription associated with a feature (as part of the processing of the electronic document). As described above, a given feature may have any number of associated prescriptions. A prescription may define an operation to be performed as part of the processing of the electronic document. Alternatively or in addition, a prescription may define a restriction to be applied by the application as part of the processing of the electronic document. The method 400 continues at block 410.

At block 410, the application B 102 processes the electronic document. The application B 102 may open, edit, print, etc. the electronic document. Moreover, the application B 102 may be limited in its processing based on the prescriptions applied for not supporting the specified features of the electronic document (see description above). The method 400 is complete.

Figure 5:
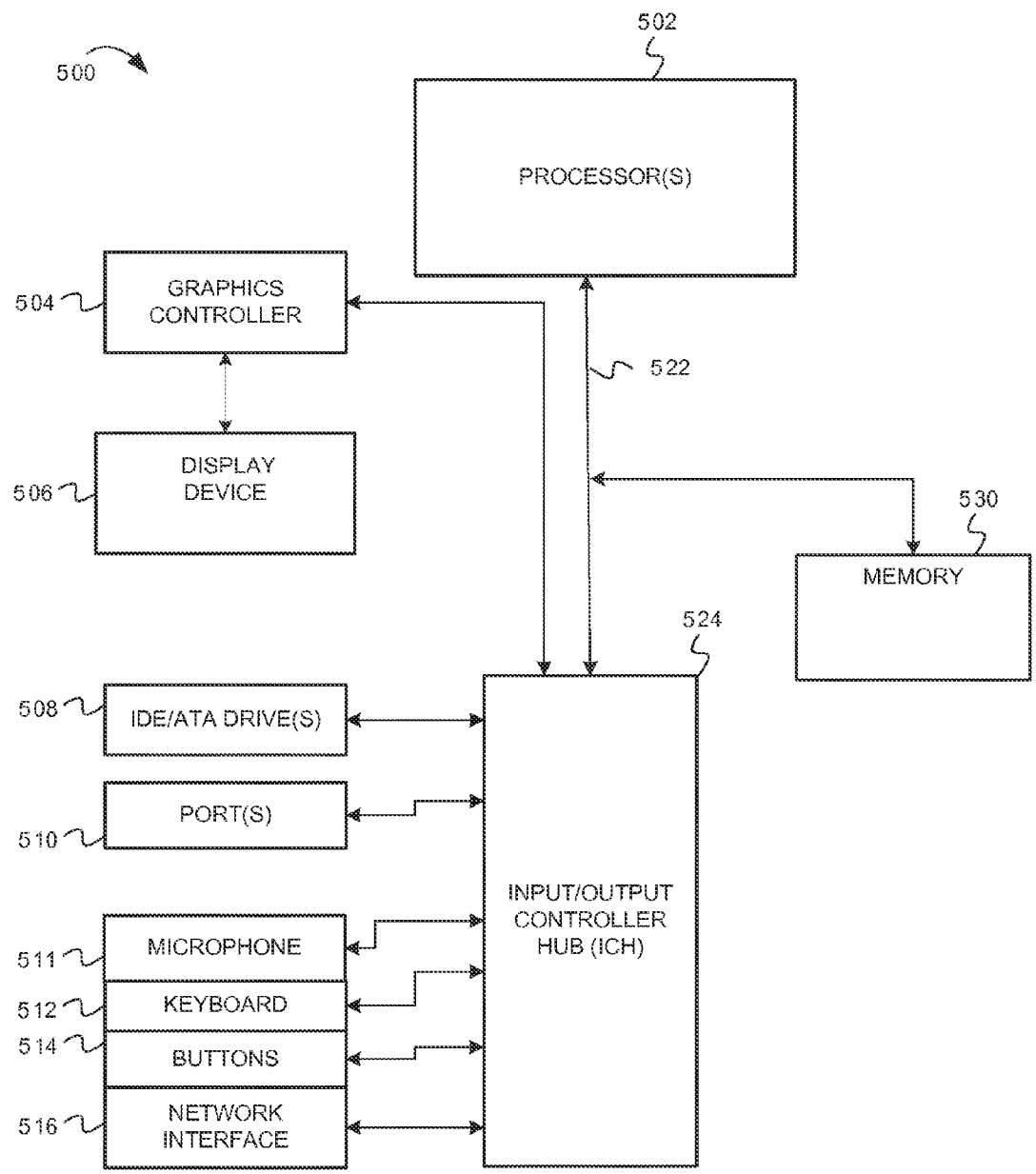
FIG. 5 illustrates a computer that may be used for creating or subsequently processing of electronic documents that include features and associated prescriptions, according to some example embodiments.

A detailed block diagram of an example computer environment, according to some embodiments, is now described. In particular, FIG. 5 illustrates a computer that may be used for creating or subsequently processing of electronic documents that include features and associated prescriptions, according to some example embodiments. A computer system 500 may be representative of one of the client devices, the servers, etc.

As illustrated in FIG. 5, the computer system 500 comprises processor(s) 502. The computer system 500 also includes a memory unit 530, processor bus 522, and Input/Output controller hub (ICH) 524. The processor(s) 502, memory unit 530, and ICH 524 are coupled to the processor bus 522. The processor(s) 502 may comprise any suitable processor architecture. The computer system 500 may comprise one, two, three, or more processors, any of which may execute a set of instructions in accordance with embodiments of the invention.

The memory unit 530 may store data and/or instructions, and may comprise any suitable memory, such as a dynamic random access memory (DRAM). The computer system 500 also includes IDE drive(s) 508 and/or other suitable storage devices. A graphics controller 504 controls the display of information on a display device 506, according to some embodiments of the invention.

The input/output controller hub (ICH) 524 provides an interface to I/O devices or peripheral components for the computer system 500. The ICH 524 may comprise any suitable interface controller to provide for any suitable communication link to the processor(s) 502, memory unit 530 and/or to any suitable device or component in communication with the ICH 524. For one embodiment of the invention, the ICH 524 provides suitable arbitration and buffering for each interface.

For some embodiments of the invention, the ICH 524 provides an interface to one or more suitable integrated drive electronics (IDE) drives 508, such as a hard disk drive (HDD) or compact disc read only memory (CD ROM) drive, or to suitable universal serial bus (USB) devices through one or more USB ports 510. For one embodiment, the 524 also provides an interface to a keyboard 512, a mouse 514, a CD-ROM drive 518, one or more suitable devices through one or more Firewire ports 516. For one embodiment of the invention, the ICH 524 also provides a network interface 520 though which the computer system 500 can communicate with other computers and/or devices.

In some embodiments, the computer system 500 includes a machine-readable medium that stores a set of instructions (e.g., software) embodying any one, or all, of the methodologies for described herein. Furthermore, software may reside, completely or at least partially, within memory unit 530 and/or within the processor(s) 502.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In example embodiments, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computer-implemented method comprising:
   receiving an electronic document the electronic document comprising a list of one or more specified features for use during processing of the electronic document by an application;
   determining if a specified feature from the list of the one or more specified features is not supported by the application; and
   executing, using one or more processors, an operation that is defined by a prescription corresponding to the specified feature in response to a determination that the specified feature is not supported by the application, the prescription defining at least one of an operation to be performed or a restriction to be applied by the application as part of subsequent processing of the electronic document, the prescription to preclude the specified feature based on an incidental value of the specified feature in understanding the electronic document.

2. The computer-implemented method of claim 1, wherein the prescription comprises disabling access to the electronic document by the application.

3. The computer-implemented method of claim 1, wherein the electronic document comprises a form that includes a field to be completed by a subsequent user of the form, wherein the specified feature comprises encryption prior to submission of the form that includes the field completed by the subsequent user, wherein the prescription comprises disabling submission of the form that includes the field completed by the subsequent user.

4. The computer-implemented method of claim 1, comprising determining a version of the specified feature, wherein the executing of the operation that is defined by prescription is in response to a determination that the version or a later version of the specified feature is not supported by the application.

5. The computer-implemented method of claim 1, wherein the specified feature and the prescription are defined by a creator of the electronic document.

6. The computer-implemented method of claim 5, wherein the specified feature and the prescription are defined by the creator during the creation of the electronic document using a different application.

7. The computer-implemented method of claim 6, wherein the application is a previous version of the different application.

8. The computer-implemented method of claim 1, comprising recording the feature and the corresponding prescription in a data structure of the electronic document.

9. A non-transitory machine-readable storage medium including instructions which when executed by a machine causes the machine to perform operations comprising:
 creating an electronic document using an application, the creating comprising,
 marking an electronic document with a specified feature for use during processing of the electronic document by a different application that is to subsequently process the electronic document; and
 marking the electronic document with a prescription that defines at least one of an operation to be performed or a restriction to be applied by the different application as part of subsequent processing of the electronic document in response to a determination that the different application does not support the specified feature, the prescription corresponding to the specified feature in a data structure of the electronic document, the prescription to preclude the specific feature based on an incidental value of the specified feature in understanding the electronic document; and
 storing the electronic document into a machine-readable medium.

10. The machine-readable storage medium of claim 9, wherein the application is a later version of the different application.

11. The machine-readable storage medium of claim 9, wherein the prescription disables printing of the electronic document by the different application.

12. The machine-readable storage medium of claim 9, wherein the electronic document comprises a form that includes a field to be completed by a subsequent user of the form, wherein the specified feature comprises encryption prior to submission of the form that includes the field completed by the subsequent user, wherein the prescription comprises disabling submission of the form that includes the field completed by the subsequent user.

13. A non-transitory machine-readable storage medium including an electronic document comprising:
 document content; and
 a data structure comprising an entry comprising a specified feature for use during processing of the electronic document by an application that is to subsequently process the document content of the electronic document, the entry comprising a prescription that defines at least one of an operation to be performed or a restriction to be applied by the application as part of subsequent processing of the document content of the electronic document, the prescription indicating an operation to be executed in response to a determination that the specified feature is not supported by the application, the prescription corresponding to the specified feature in the data structure of the electronic document, the prescription to preclude the specified feature based on an incidental value of the specified feature in understanding the electronic document.

14. The machine-readable storage medium of claim 13, wherein the prescription comprises disabling digital signing of the electronic document by the application.

15. The machine-readable storage medium of claim 13, wherein the prescription comprises a message to be output to a display screen.

16. The machine-readable storage medium of claim 13, wherein the specified feature and the prescription are added to the electronic document based on a document type.

17. An apparatus comprising:
 a non-transitory machine-readable medium to store an electronic document created using an application; and
 a processor to execute instructions of a different application that is to process the electronic document, wherein execution of the instructions is to cause a determination of a specified feature for use during processing of the electronic document by the different application, execution of the instructions is to cause execution of an operation defined by at least one prescription corresponding to the specified feature in response to a determination that the specified feature is not supplied by the different application, the at least one prescription defining at least one of an operation to be permitted and a restriction to be applied by the different application as part of processing of the electronic document, the prescription to preclude the specified feature based on an incidental value of the specified feature in understanding the electronic document.

18. The apparatus of claim 17, wherein the at least one prescription comprises disabling editing of the electronic document by the different application.

19. The apparatus of claim 17, wherein the electronic document comprises a form that includes at least one field to be completed by a subsequent user of the form, wherein the specified feature comprises encryption prior to submission of the form that includes the at least one field completed by the subsequent user, wherein the at least one prescription comprises disabling submission of the form that includes the at least one field completed by the subsequent user.

20. The apparatus of claim 17, wherein the at least one prescription comprises two or more prescriptions.

21. The apparatus of claim 17, wherein execution of the instructions is to cause a determination of a version of the feature, wherein execution of the operation defined by the at least one prescription is in response to a determination that the version or a later version of the specified feature is not supported by the different application.

22. The apparatus of claim 17, wherein the specified feature and the at least one prescription are defined by a creator of the electronic document.

23. The apparatus of claim 22, wherein the creator is to define the specified feature and the at least one prescription during the creation of the electronic document using the application.

24. The apparatus of claim 17, wherein the application is a previous version of the different application.

\* \* \* \* \*

UNITED STATES PATENT AND TRADEMARK OFFICE
CERTIFICATE OF CORRECTION

| | | |
|---|---|---|
| PATENT NO. | : 8,489,536 B1 | Page 1 of 1 |
| APPLICATION NO. | : 13/430473 | |
| DATED | : July 16, 2013 | |
| INVENTOR(S) | : Young et al. | |

It is certified that error appears in the above-identified patent and that said Letters Patent is hereby corrected as shown below:

In the Claims

In column 10, line 56, in claim 1, after "document", insert --,--, therefor

In column 11, line 20, in claim 4, before "prescription", insert --the--, therefor In column 11, line 40, in claim 9, delete "comprising," and insert --comprising:--, therefor In column 11, line 53, in claim 9, delete "specific" and insert --specified--, therefor In column 12, line 12, in claim 13, after "entry", insert --of the electronic document further--, therefor In column 12, line 45, in claim 17, delete "supplied" and insert --supported--, therefor In column 12, line 47, in claim 17, delete "permitted" and insert --performed--, therefor Signed and Sealed this
Third Day of September, 2013

Teresa Stanek Rea
*Acting Director of the United States Patent and Trademark Office*